R. WHEELER.
ADJUSTABLE FRUIT CELL.
APPLICATION FILED FEB. 3, 1914.
1,153,365.
Patented Sept. 14, 1915.
Fig. 2.
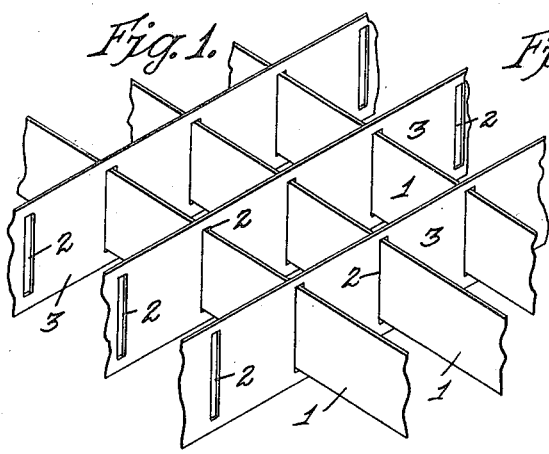
Fig. 1.
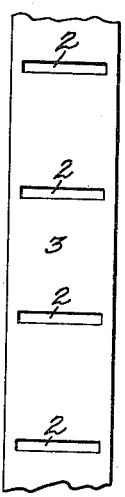
Fig. 3.
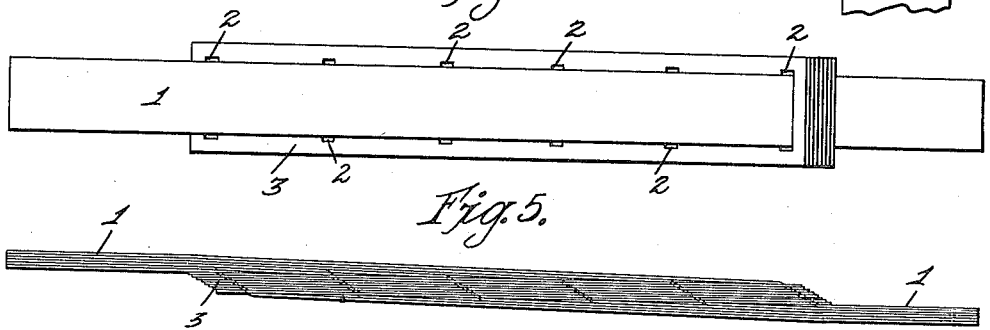
Fig. 4.
Fig. 5.
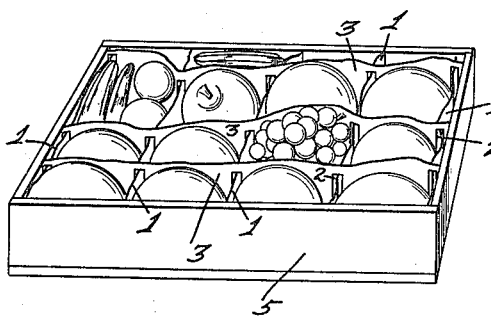
Fig. 6.
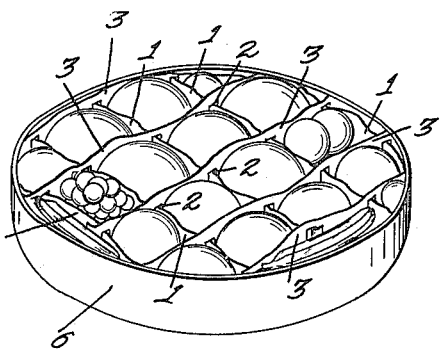
Fig. 7.
WITNESSES:
F. A. Simney
A. H. Kephart
INVENTOR.
RICHARD WHEELER.
BY
Carlos P. Griffin
ATTORNEY.
COLUMBIA PLANOGRAPH CO., WASHINGTON, D. C.

UNITED STATES PATENT OFFICE.

RICHARD WHEELER, OF SAN FRANCISCO, CALIFORNIA, ASSIGNOR, BY MESNE ASSIGNMENTS, OF SEVENTY-SIX ONE-HUNDREDTHS TO H. W. REGAN, VERNARD O. DAVIS, AND S. D. MERK, ALL OF BURLINGAME, CALIFORNIA.

ADJUSTABLE FRUIT-CELL.

1,153,365.  Specification of Letters Patent.  Patented Sept. 14, 1915.

Application filed February 3, 1914.  Serial No. 816,299.

*To all whom it may concern:*

Be it known that I, RICHARD WHEELER, a citizen of the United States, residing at San Francisco, in the county of San Francisco and State of California, have invented a new and useful Adjustable Fruit-Cell, of which the following is a specification in such full and clear terms as will enable those skilled in the art to construct and use the same.

This invention relates to cells for fruit for use in shipping boxes, and its object is to provide cells which will keep one kind of fruit separate from another, and which cells may be adjusted so as to permit different sized fruits being packed together or often different kinds of fruits, the size of one cell being easily changed from that of the adjacent cell.

An object of the invention is to produce a cell construction which may be as easily used in a round tray as in a rectangular box.

Another object of the invention is to produce fruit or vegetable cells, the parts of which shall be of the most simple construction thereby enabling the cells to be produced at a minimum expense.

An embodiment of the invention is shown in the drawing in which the same reference numeral is applied to the same portion throughout, but I am aware that there are many modifications thereof.

Figure 1 is a perspective view of a portion of the two members forming the completed cells as they appear when the cells are expanded ready for use, Fig. 2 is a plan view of a portion of one of the cell members, Fig. 3 is a plan view of a portion of another of the cell members, Fig. 4 is a side elevation of the two sets of cell members as they appear when assembled ready for use, Fig. 5 is an edge view of the two cell members assembled as shown in Fig. 4, Fig. 6 shows a set of the cell members in a fruit tray and illustrating the adjustability of the two portions of the cell to enable round fruits, grapes or bananas to be packed in the box, and Fig. 7 is a perspective view of a round tray in which the cell members have been assembled and showing different kinds of fruits in position therein, the cells being adjusted to fit the several varieties of fruits.

The cells are formed of a series of flat strips of a suitable card board 1, which strips are of such width as to pass through slots 2 in wider card board strips 3, the latter strips having as many slots 2 therein as is deemed necessary for the given box or tray.

A number of strips 3 are laid side by side and one of the strips 1 is inserted through the adjacent holes in all of the strips 3, one of said strips 1 being used for each of the holes in one of the strips 3. After being so assembled the bundle of strips may be dropped in place in the tray and spread apart as indicated in Fig. 4, after which the fruit may be placed in the several cells and each of the strips will be moved into contact with the particular piece of fruit whether it be large or small, or if the fruit happens to be all of the same size all of the cells may be adjusted to the desired size and the several pieces of fruit may be placed therein.

The numeral 5 indicates a rectangular box or tray in which several of the parts forming the cells have been placed, said tray being divided up for several sizes of round fruits, a bunch of grapes and some long fruits, as well as smaller ones.

In Fig. 7 the numeral 6 indicates a circular tray in which several of the members forming the cells have been placed and so adjusted as to receive a number of large fruits, two long fruits such as banana and some smaller fruits.

Having thus described my invention what I claim as new and desire to secure by Letters Patent of the United States, is as follows, modifications within the scope of the claim being expressly reserved:

A fruit packing device comprising a series of thin flexible strips each having a plurality of transverse slots formed in the body of the strips distant from the edges thereof and capable of being curved in either of two directions, and a series of narrower strips extending through the slots and upon which latter strips the slotted strips are freely movable.

In testimony whereof I have hereunto set my hand this 23d day of September A. D. 1913, in the presence of the two subscribed witnesses.

RICHARD WHEELER.

Witnesses:
CARLOS P. GRIFFIN,
L. H. ANDERSON.